(12) United States Patent
Jing et al.

(10) Patent No.: US 9,525,303 B2
(45) Date of Patent: Dec. 20, 2016

(54) WIRELESS CHARGER CIRCUIT AND METHOD

(71) Applicant: Silicon Spread Corporation, San Jose, CA (US)

(72) Inventors: Tao Jing, Fremont, CA (US); Chenxiao Ren, Fremont, CA (US); Yongmin Ge, Sunnyvale, CA (US)

(73) Assignee: SILICON SPREAD CORPORATION, San Jose, CA (US)

( * ) Notice: Subject to any disclaimer, the term of this patent is extended or adjusted under 35 U.S.C. 154(b) by 0 days.

(21) Appl. No.: 15/000,940

(22) Filed: Jan. 19, 2016

(65) Prior Publication Data

US 2016/0134156 A1    May 12, 2016

Related U.S. Application Data

(62) Division of application No. 13/734,610, filed on Jan. 4, 2013, now Pat. No. 9,276,625.

(51) Int. Cl.
| | | |
|---|---|---|
| *H02J 7/04* | (2006.01) | |
| *H02J 7/02* | (2016.01) | |
| *H04B 1/3883* | (2015.01) | |
| *H02J 7/00* | (2006.01) | |
| *H04M 1/02* | (2006.01) | |
| *H04M 1/00* | (2006.01) | |

(52) U.S. Cl.
CPC .............. *H02J 7/025* (2013.01); *H02J 7/0044* (2013.01); *H04B 1/3883* (2013.01); *H04M 1/0202* (2013.01); *H02J 2007/0098* (2013.01)

(58) Field of Classification Search
CPC .......... H02J 7/0045; H02J 7/00; H02J 7/0027; H02J 7/025; H02J 7/0036; H02J 7/04; H02J 2007/0039; H02J 7/045; H02J 50/10; H02J 7/0034
USPC .................................. 320/165; 455/572, 573
See application file for complete search history.

(56) References Cited

U.S. PATENT DOCUMENTS

| | | | |
|---|---|---|---|
| 4,583,034 A | 4/1986 | Martin | |
| 5,666,605 A | 9/1997 | Tokimatsu et al. | |
| 6,774,607 B2 * | 8/2004 | Moseneder | H02J 7/0034 320/165 |
| 6,972,543 B1 | 12/2005 | Wells | |
| 7,392,068 B2 | 6/2008 | Dayan et al. | |
| 9,276,625 B2 * | 3/2016 | Jing | H04B 1/3883 |
| 2006/0145658 A1 | 7/2006 | Wang | |
| 2009/0184679 A1 * | 7/2009 | Yeh | H02J 7/025 320/108 |

(Continued)

*Primary Examiner* — Lee Nguyen
(74) *Attorney, Agent, or Firm* — VLP Law Group LLP; Edward C. Kwok

(57) ABSTRACT

A charging system for a mobile device includes a transmitter and a receiver. The transmitter includes (a) a first interface to a power source; (b) a second interface to the receiver; (c) a polarity detection circuit for detecting polarities of the; and (d) first and second switches controlled by the polarity detection circuit, wherein each switch selectively connects a terminal of the first interface to a terminal of the second interface. The receiver includes: (a) a first interface; (b) a second interface coupled to a device to be charged; and (c) a connection circuit between a terminal of the first interface and a terminal of the second interface, wherein the connection circuit is conductive when the voltage across these terminals is of a first polarity, and a second polarity otherwise.

28 Claims, 11 Drawing Sheets

CHARGE SYSTEM (a) CHARGE BASE;
(b) DEVICE (CELL PHONE HERE) BACK COVER OR CASE;
(c) CELL PHONE

(56) References Cited

U.S. PATENT DOCUMENTS

2010/0012725 A1    1/2010   Zemba et al.
2013/0036906 A1    2/2013   Dunn
2014/0055078 A1    2/2014   Jing
2014/0283686 A1    9/2014   Dunn

* cited by examiner

CHARGE SYSTEM (a) CHARGE BASE;
  (b) DEVICE (CELL PHONE HERE) BACK COVER OR CASE;
  (c) CELL PHONE

CELL PHONE TO BE CHARGED (a)INSIDE VIEW OF THE COVER/CASE;
  (b) DEVICE (CELL PHONE HERE)

CHARGE BASE (a) TOP VIEW;
(b) INSIDE VIEW OF CHARGE BASE

CHARGE SYSTEM (a) LEFT, CHARGE BASE
(b) RIGHT, TO BE CHARGED

WIRELESS CHARGER CIRCUIT AND METHOD

CROSS-REFERENCE TO RELATED APPLICATIONS

The present invention claims priority from, and is a divisional application of, U.S. patent application Ser. No. 13/734,610, filed on Jan. 4, 2013, which is incorporated herein by reference in its entirety as if fully set forth herein.

BACKGROUND OF THE INVENTION

1. Field of the Invention

The present application relates to charging circuits for charging batteries in portable devices.

2. Discussion of the Related Art

There are two categories of wireless chargers for portable devices. In this regard, the term "wireless charger" refers to a charger that does not connect to the device to be charged through a charging cable. In one category, which is referred to herein as "direct contact chargers", a charger or charging station ("charge base") transfers energy through direct contacts to the device being charged. In the other category, which is referred to herein as "inductive chargers", a charger transfers energy over an electromagnetic field that couples the charger to the portable device being charged. Typically, an inductive charger is provided in the form of a charge base, and energy is transferred by inductive coupling from the electromagnetic field generated by the charge base to an electrical circuit, which in turns charges the batteries of the portable device.

An inductive charger typically has an induction coil which creates an alternating electromagnetic field from within the charge base. A second induction coil, provided in the portable device, takes power from the electromagnetic field and converts it into an electrical current to charge the battery. The two induction coils in proximity effectively form an electrical transformer. This form of induction charging has many disadvantages not present in direct contact charging. For example, relative to direct contact chargers, inductive chargers have a lower efficiency and increased resistive heating. As energy that is lost turns into heat, an inductive charger can get quite warm during charging. An increase in temperature unduly increases stress to the battery, so that batteries that are charged in this manner may not last as long, as compared to batteries charged on a mat or through a regular plug-in charger. The heat buildup, which occurs only during charging, represents a low efficiency that depends significantly on the relative position of the two inductively coupled coils. Implementations that use lower frequencies or older drive technologies charge more slowly and generate more heat. Unlike direct contact chargers, inductive chargers include drive electronics and coils, thus increasing complexity and manufacturing costs. Another disadvantage is a public health concern that the alternating electromagnetic field (~5 W, at radio frequencies in the 80-300 kHz range) is typically used very close to the human body. Some charge bases transmit at 915 MHz, which is the frequency that is used for food heating in microwave ovens.

There are many ways to implement direct contact charging. One way uses point-to-point electrodes, such as those used in home cordless telephones. One disadvantage of point-to-point electrodes is device alignment (i.e., the charge base and the device being charged are required to be placed precisely aligned in position and in correct polarities). Another way uses multiple-point to strips, such as used in the Wildcharge system. The disadvantage is the device to be charged has to have multiple electrodes arranged in a small circle, which is usually provided at the weight center of the device to be charged to prevent tilting. If the device is tilted, electrical contact is lost and charging fails. Another disadvantage results from misaligned positions between the charge base and the device being charged (e.g., when two electrodes fall between two adjacent electrode strips).

SUMMARY

According to one embodiment of the present invention, two or more conducting layers are provided on a charge base as electrodes, such that a portable device to be charged can be placed in any position without risking disconnection from one electrode. As a result, the device to be charged does not need to have more than two electrodes which also do not need to be placed at or near the weight center of the portable device. The two electrodes on the portable device to be charged can be placed anywhere on that device, so long as the distance between these electrodes is greater than the base electrode plate on the charge base.

A charging system for a mobile device includes a transmitter and a receiver. The transmitter includes (a) a first interface to a power source having a first terminal and a second terminal; (b) a second interface to the receiver having a first terminal and a second terminal; (c) a polarity detection circuit coupled to the first and second terminals of the second interface for detecting polarities of the first and second terminals of the second interface; and (d) first and second switches controlled by the polarity detection circuit, wherein the first switch selectively connects the first terminal of the first interface to either the first terminal of the second interface or the second terminal of the second interface, and wherein the second switch selectively connects the first terminal of the first interface to either the first terminal of the second interface or the second terminal of the second interface. The receiver includes: (a) a first interface having a first terminal and a second terminal; (b) a second interface having a first terminal and a second terminal coupled to a device to be charged; and (c) a connection circuit between the first terminal of the first interface and the first terminal of the second interface, wherein the connection circuit is conductive when the voltage across the first terminal of the first interface and the second terminal of the first interface is of a first polarity, and the connection circuit is non-conductive when the voltage across the first terminal of the first interface and the second terminal of the first interface is of a second polarity opposite the first polarity.

According to one embodiment of the present invention, after the polarities of the device to be charged are determined, identification information is exchanged between the transmitter and the receiver. In one embodiment, current is monitored throughout to prevent power transfer from the device to be charged and the charge base.

The present invention is better understood upon consideration of the detailed description below in conjunction with the accompanying drawings.

DETAILED DESCRIPTION OF THE PREFERRED EMBODIMENTS

Figure 1:
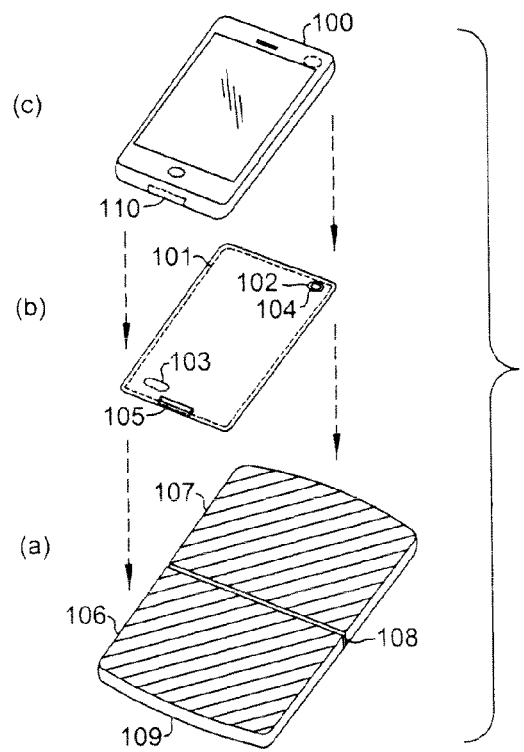
FIG. 1 shows a charging configuration for charge base 109, back cover 101 and portable cellular telephone 100, in accordance with one embodiment of the present invention.

FIG. 1 shows a charging configuration for charge base 109 and portable cellular telephone 100, in accordance with one embodiment of the present invention. As shown in FIG. 1, on one surface of charging station 109 is provided planar electrodes 106 and 107 separated and insulated from each other by gap 108. Cellular telephone 100 may be provided back cover 101 for attachment to the reverse side of cellular telephone 100, as shown in FIG. 1. On one side of back cover 101 is provided conductive ring 102 positioned around edge 104 over the outside perimeter of camera 114 (see FIG. 2), which is customarily provided on a smartphone. On the other side of back cover 101 is provided conductive plate 103, which may also serve, for example, as a logo plate for cellular telephone 100. In this embodiment, during charging, conductive ring 102 and conductive plate 103 also serve as electrodes on cellular telephone 100 for contacting counterpart planar electrodes 106 and 107 of charge base 109, as shown in FIG. 1. Back cover 101 also includes connector 105, which is provided to couple with power connector 110 of cellular telephone 100 (see FIG. 2). Power connector 110 is otherwise the receptacle for a charging cable that is used to charge cellular telephone 100 in conventional charging.

Figure 2:
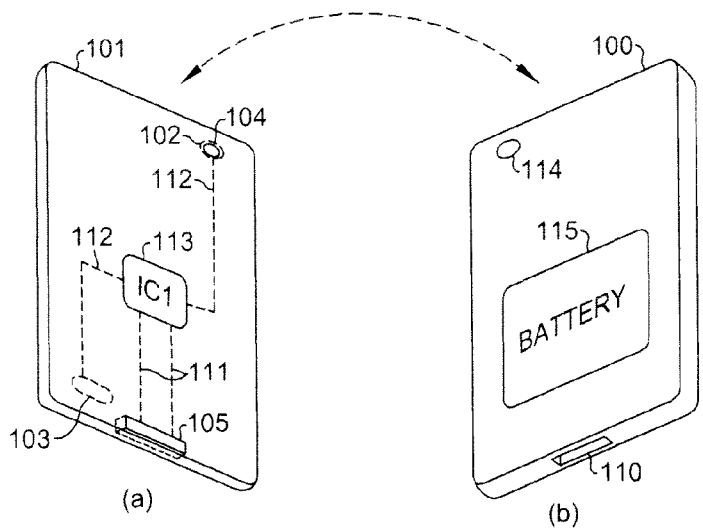
FIG. 2 shows a reverse side of back cover 101 in relation to the reverse side of cellular telephone 100 (shown schematically), in accordance with one embodiment of the present invention.

FIG. 2 shows a reverse side of back cover 101 in relation to the reverse side of cellular telephone 100 (shown schematically), in accordance with one embodiment of the present invention. As shown in FIG. 2, connector 105 is shown configured for coupling to power connector 110. On the reverse side of back cover 101 is provided integrated circuit 113 ("receiver IC3"), which is electrically connected to conductive ring 102, conductive plate 103 and connector 105. As shown in FIG. 2, a conductive path 112 (e.g., a wire) on back cover 101. FIG. 2 also shows schematically battery 115 of cellular telephone 100.

Figure 3:
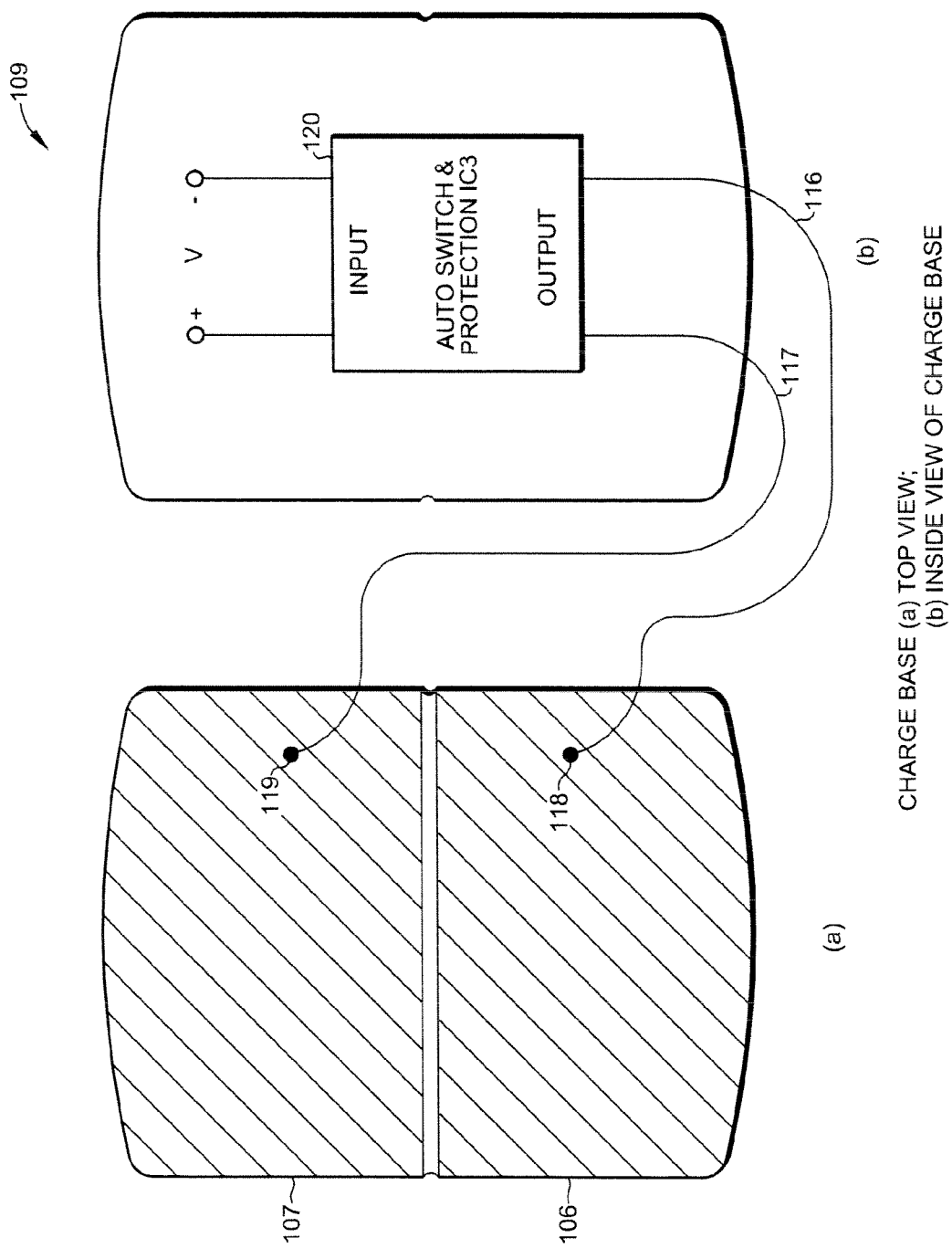
FIG. 3 shows schematically charge base 109, in accordance with one embodiment of the present invention.

FIG. 3 shows schematically charge base 109, in accordance with one embodiment of the present invention. As shown in FIG. 3, charge base 109 includes integrated circuit 120 ("auto switch and protection IC"), which is connected to planar electrodes 106 and 107 at conducting points 118 and 119 through conductive paths 116 and 117 (e.g., conductive wires), respectively. Integrated circuit 120 may be powered, for example, by a USB source, a battery or a power adapter.

Figure 4:
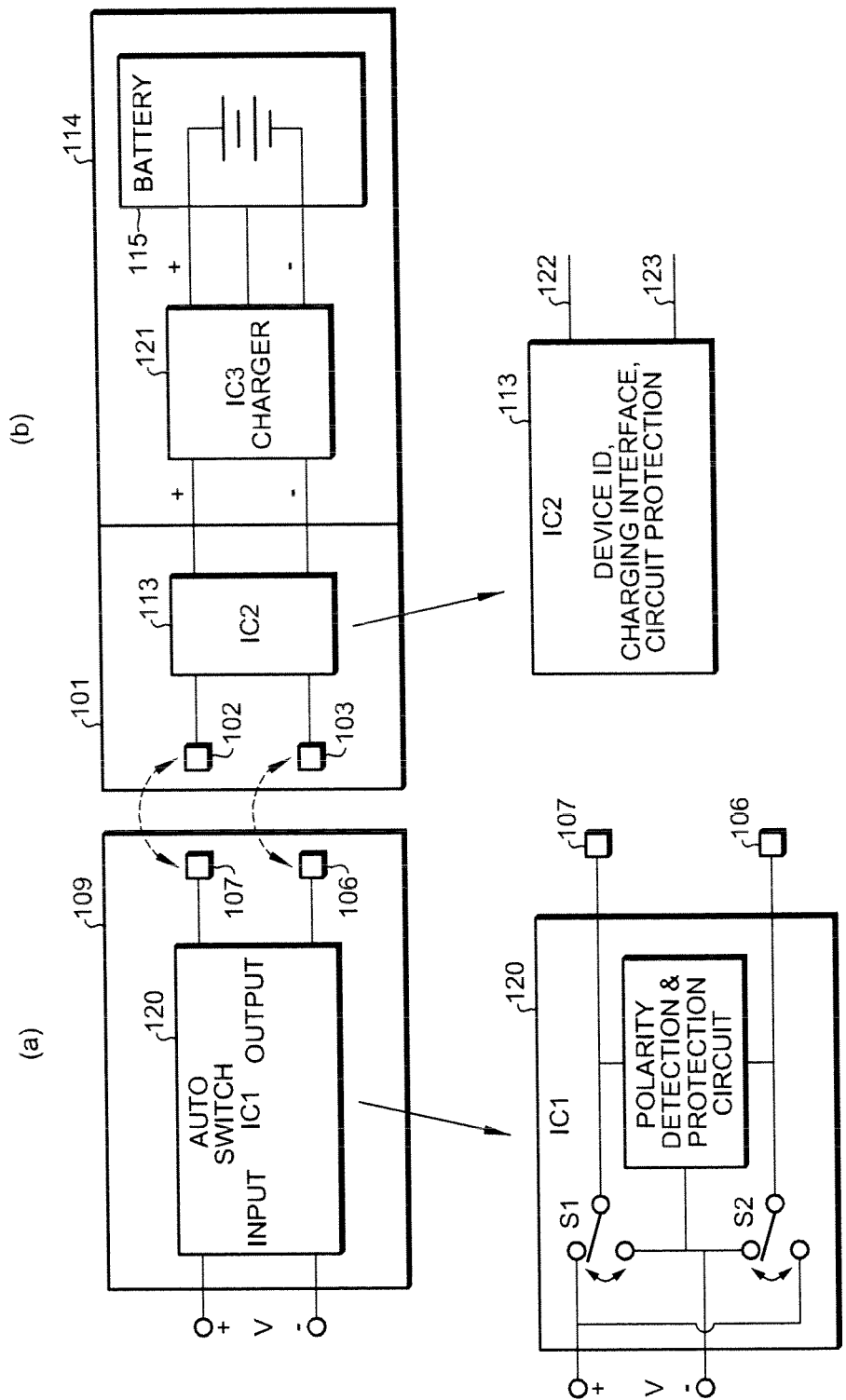
FIG. 4 is a block diagram of a charger system including integrated circuit 120 in charge base 120, integrated circuit 113 on back cover 101 and charger integrated circuit 121 in cellular telephone 100, in accordance with one embodiment of the present invention.
Figure 5A:
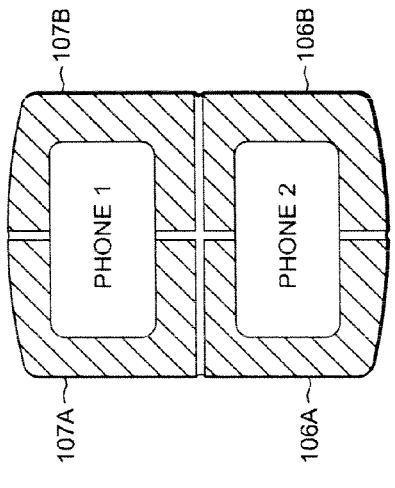
FIGS. 5(a)-5(d) shows a 4-electrode charge base which can charge up to two cellular telephones.
Figure 5B:
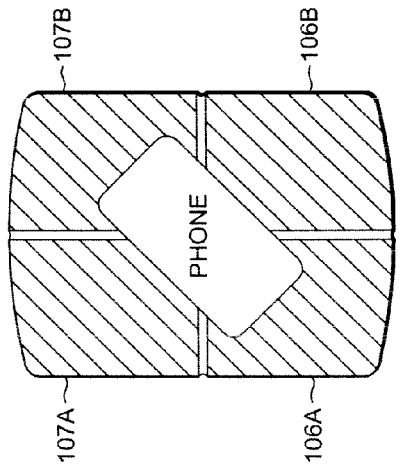
Figure 5C:
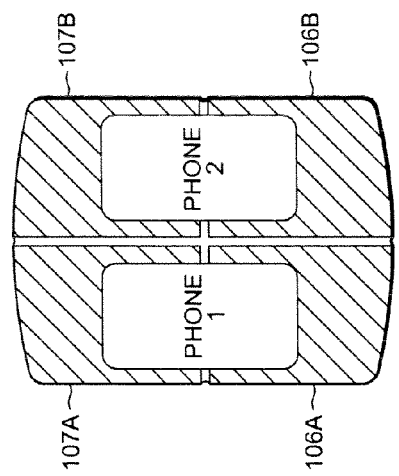
Figure 5D:
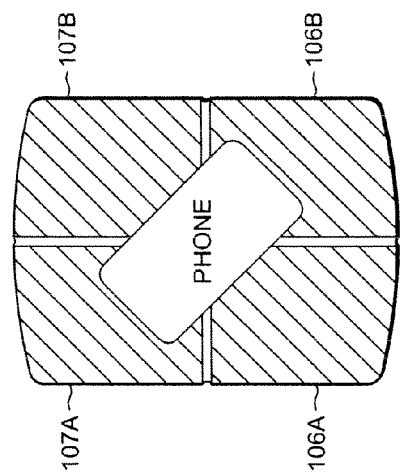

FIG. 4 is a block diagram of a charge system including integrated circuit 120 in charge base 109, integrated circuit 113 on back cover 101 and charger integrated circuit 121 in cellular telephone 100, in accordance with one embodiment of the present invention. As shown in FIG. 4, integrated circuit 120 includes switches S2 and S1, which are controlled by a polarity direction and protective circuit to configure the polarities at electrodes 106 and 107. In the configuration of FIG. 4, integrated circuit 120 is the "transmitter side" integrated circuit, which sends detection signals to electrodes 106 and 107 periodically to detect if a valid electronic device to be charged is placed on charge base 109. The response by a valid device to be charged determines the polarity of the device's electrodes 102 and 103 contacting planar electrodes 106 and 107. In response, integrated circuit 120 turns on the corresponding power switches S2 and S1, thus connecting power supply V to electrodes 106 and 107 in proper polarity for charging the portable device. During charging, integrating circuit 120 also monitors the charge current in real time. When the charge current diminishes sufficiently, thus indicating that the charge is substantially complete, integrated circuit 120 sends out a "fully charged" indication. Also, after integrated circuit 120 connects power supply V to electrodes 106 and 107 through switches S2 and S1, integrated circuit 120 begins detecting in real time if the portable device being charge remains on charge base 109. When integrated circuit 120 detects the device being charged is removed from charge base 109, integrated circuit 120 returns to idle status. In the idle state, integrated circuit 120 sends detection signals to electrodes 106 and 107 periodically until a valid device to be charged is detected as being placed on charge base 109.

Thus, to summarize, according to one embodiment of the present invention, integration circuit 120 in charge base 109 is configured to perform the following steps:
 (a) detecting (i) if there is any object placed on charge base 109, (ii) if an object is detected, determining if the object is a valid electronic device, (iii) if the object is detected and the object is not a valid electronic device, outputting a signal indicating an error condition, and (iv) if an object is not detected, no action is taken;
 (b) if a valid electronic device is detected, (i) sending an electrical stimulus signal through planar electrodes 106 and 107; and (ii) measuring a response received from planar electrodes 106 and 107 to determine the polarities of the two electrodes of the device to be charged that are contacting planar electrodes 106 and 107;
 (c) after the polarities of the two electrodes of the device to be charged are determined, turning on power switches S2 and S1 within integrated circuit 102 so that the output voltage across planar electrodes 106 and 107 has polarities matching to the determined polarities of the device being charged;

(d) through the output voltage imposed on planar electrodes 106 and 107, charging the battery on the device to be charged according to a predetermined scheme (e.g., a recommended charging scheme specified by the manufacturer of the device being charged); and (e) monitoring the progress of the charging operation and taking proper actions as the battery charging progresses, e.g., reducing the output current and send out a "fully charged" indication signal when the battery is fully charged.

In one embodiment, integrated circuit 120 also monitors in real time whether or not the device being charged remains on charge base 109. When the device being charged is removed from charge base 109, integrated circuit 120 disconnects power switches S1 and S2 electrically from power supply V, and returns to step (a) where charge base 109 determines whether or not a valid electronic device has been placed on charge base 109.

In one embodiment, integrated circuit 120 also monitors the surrounding temperature; all power switches are disconnected from power supply V, when integrated circuit 120 detects a temperature that exceeds the preset threshold.

Another feature of integrated circuit 120 is the ability to communicate with integrated circuit 113 on back cover 101 using the connecting electrical paths of electrodes 102, 103, 106 and 107. This arrangement provides an internal signal communication system that does not require use of any public bandwidth, thus freeing bandwidth in the portable device for variable data communication, such as audio or video data.

Integrated circuit 113, provided on the receiver side, may be built into or included as an accessory (e.g., back cover 101) to the device to be charged. Integrated circuit 113 may provide to the transmitter side (i.e., integrated circuit 120) information to validate the device to be charged and the polarities of its electrodes. Communicating through electrodes 102, 103, 106 and 107, integrated circuit 113 provides identification information to integrated circuit 120. As described above, after integrated circuit 120 determines that the device to be charged is an appropriate device, integrated circuit 120 provides a charging voltage at electrodes 106 and 107 to charge the battery inside the device being charged.

Thus, as described above, integrated circuit 120 on the charge base 109 detects the polarities of the electrodes of the device to be charged that are contacting charge base 109. The same principles may be applied for a charger having more than two charge electrodes, such as the 4-electrode charge base shown in FIGS. 5(*a*)-5(*d*). FIGS. 5(*a*)-5(*d*) show a 4-electrode charge base which can accommodate up to two cellular telephones placed in various orientations. The use of multiple electrodes on a charge base provides greater charge flexibility and allows simultaneous charging of multiple devices. Various configurations, such as, 6, 8 or more electrodes can be easily provided.

Figure 6:
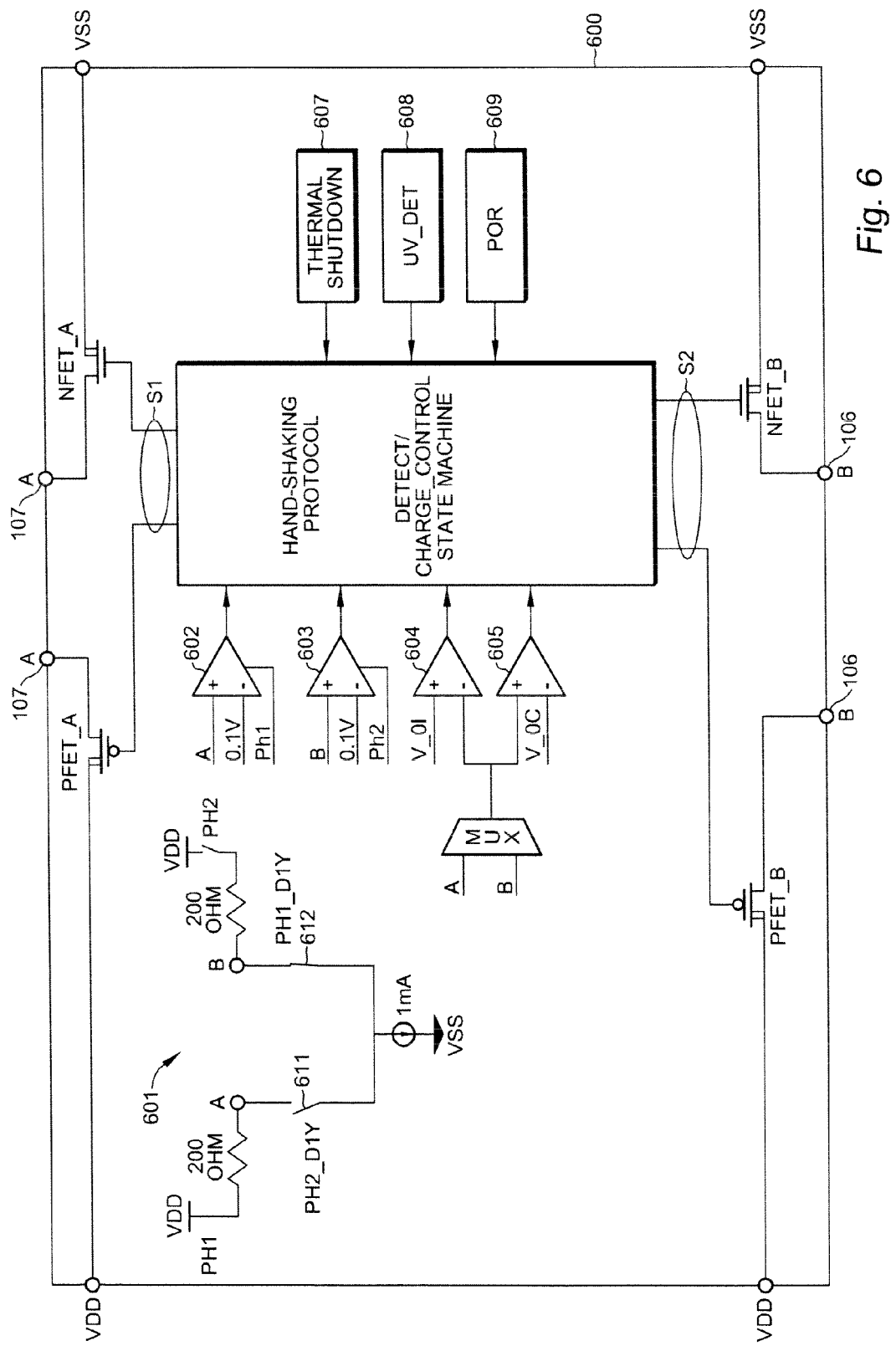
FIG. 6 shows block diagram 600 representing integrated circuit 120, in accordance to one embodiment of the present invention.

FIG. 6 shows block diagram 600 representing integrated circuit 120, in accordance to one embodiment of the present invention. In FIG. 6, electrodes 106 and 107 represented respectively by terminal labeled "B" and "A", respectively. Transistors PFET_A and NFET_A thus form switch S1 which selectively connects electrode 107 to power terminal VDD or ground terminal VSS, according to the detected polarity of the device to be charged. Similarly, transistors PFET_B and NFET_B form switch S2 which selectively connects electrode 106 to power terminal VDD or ground terminal VSS, according to the detected polarities in the electrodes of the device to be charged. To detect the validity and the polarities of the device to be charged, integrated circuit 120 sends signals to the receiver side (e.g., integrated circuit 113) according to a hand-shaking protocol. The response from the receiver side provides identification information (e.g., device name and device model). Circuit 600 includes circuit 601 for detecting polarities of the device to be charged. As shown in FIG. 6, switches 611 and 612 are provided to selectively connect electrodes 107 and 106 to power terminal VDD at clock phases ph1 and ph2. At the first phase (ph1), switch 611 on the "A" side is open and switch 612 on the "B" side is closed while electrode 107 is connected to VDD. If the positive terminal of the device to be charged is placed on electrode 107 on the "A" side, a current of 1 mA can be drawn from electrode 106 on the "B" side. The conducting current provides a valid "1" at the output terminal of comparator 602; otherwise, a valid "0" is provided at the output terminal of comparator 602. At the second phase (ph2), switch 611 on the "A" side is closed and switch 612 is open while electrode 106 is connected to VDD. If the positive terminal of the device to be charged is placed on electrode 106 on the "B" side, a current of 1 mA can be drawn from electrode 107 on the "A" side. The conducting current provides a valid "1" at the output terminal of comparator 603; otherwise, a valid "0" is provided at the output terminal of comparator 603. The results achieved in phases ph1 and ph2 are combined:

Case 1: When no load is connected across electrodes 106 and 107, both phases result in a valid "0."

Case 2: When there is a short circuit between "A" (107) and "B" (106), a valid "1" is detected in both phases, which is recognized as an invalid load.

Case 3: When a device to be charged with a valid receiver integrated circuit (e.g., integrated circuit 113) is placed between terminal "A" (i.e., electrode 107) and terminal "B" (i.e., electrode 106) with the positive terminal touching terminal "A" (107) and the negative terminal touching terminal "B" (i.e., electrode 106), a valid "1" is obtained at comparator 602 at phase ph1 and a valid "0" at comparator 603 at phase ph2. This result is recognized as a valid load. Polarity detection may be repeated to confirm the result. Integrated circuit 120 then connects terminal "A" (107) to power terminal VDD (e.g., by turning on transistor PFET_A of switch S2) and terminal "B" (106) to ground terminal VSS (e.g., by turning on transistor NFET_B of switch S1). Charging can then begin.

Case 4: When the device to be charged with a valid receiver integrated circuit (e.g., integrated circuit 113) is placed between terminal "A" (i.e., electrode 107) and terminal "B" (i.e., electrode 106) with the negative terminal touching terminal "A" (107) and the positive terminal touching terminal "B" (i.e., electrode 106), a valid "0" is obtained at comparator 602 at phase ph1 and a valid at comparator 603 at phase ph2. This result is recognized as a valid load. Polarity detection may be repeated to confirm the result. Integrated circuit 120 then connects terminal "B" (106) to power terminal VDD (e.g., by turning on transistor PFET_B of switch S2) and terminal "A" (106) to ground terminal VSS (e.g., by turning on transistor NFET_A of switch S2). Charging can then begin.

Simultaneously, the transmitter side (i.e., integrated circuit 120) sends, according to the hand-shaking protocol, a command to the receiver side (e.g., integrated circuit 113) to obtain identification information. The receiver integrated circuit responds according to the hand-shake protocol. According to one embodiment of the present invention, the hand-shaking protocol is implemented by a proprietary hand-shaking protocol that requires the conduction current to flow only from the positive terminal to the negative terminal of the device to be charged; and the reverse conduction current to be negligible. Thus, the valid receiver integrated circuit informs the transmitter integrated circuit that (1) it is the valid receiver, and (2) the proper polarities of its electrodes as currently placed on charge base 109. In response to the transmitter's command, the receiver integrated circuit sends back identification information through the contacting electrodes.

After charging begins, integrated circuit 120 monitors the charge current passing through switches S1 and S2. When the charge current falls below the "charge finish" threshold, integrated circuit 120 initializes hand-shake detection to determine whether or not the current reduction is due to removal of the device being charged from charge base 109 or the device being charged remains on charge base 109, but is approaching being fully charged. If Case 1 condition is detected at the output terminals of comparators 604 and 606, the device being charged is removed. If the hand-shaking result shows Case 2 condition or Case 3 condition at the output terminals of comparators 604 and 606, the device being charged is considered fully charged. Integrated circuit 120 reports the results accordingly.

According to one embodiment of the present invention, integrated circuit 120 also detects if the charge current is higher than an "over-current-protection" threshold. If the charge current exceeds the over-current protection threshold, integrated circuit 120 turns off the appropriate transistors of switches S1 and S2 to avoid damage to charge base 109, and indicates the condition by turning on the corresponding fault condition light. In the same embodiment, abnormal conditions, such as an out-of-range temperature or voltage, are also monitored. If an abnormal condition is detected, integrated circuit 120 takes appropriate lock-out or shut-down actions.

Figure 7:
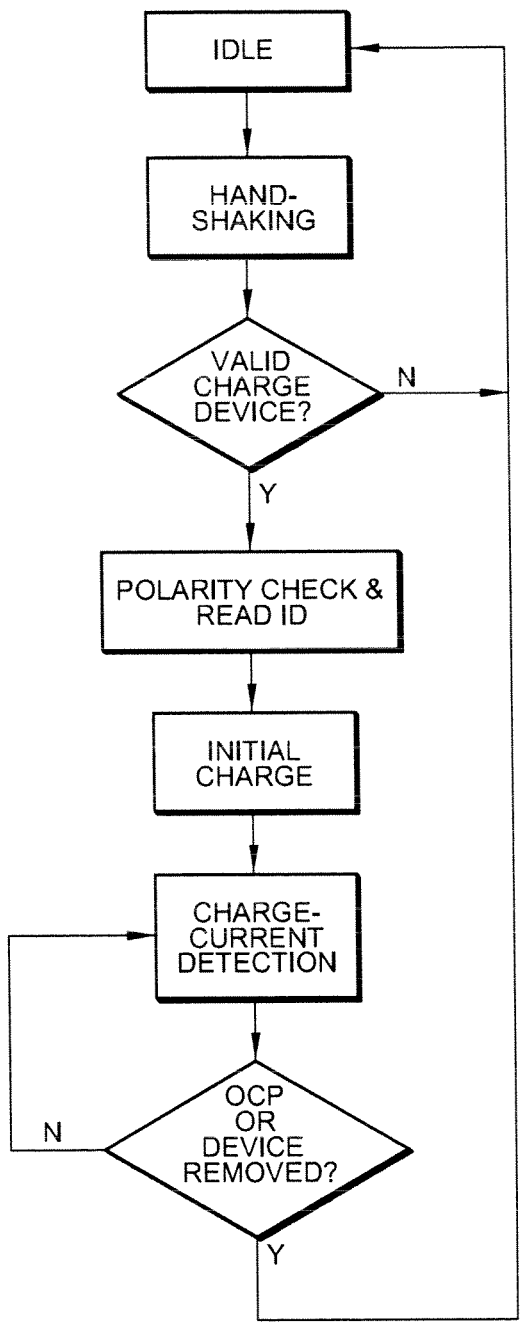
FIG. 7 shows flow-chart 700 summarizing operations of a transmitter side integrated circuit described above.
Figure 8A:
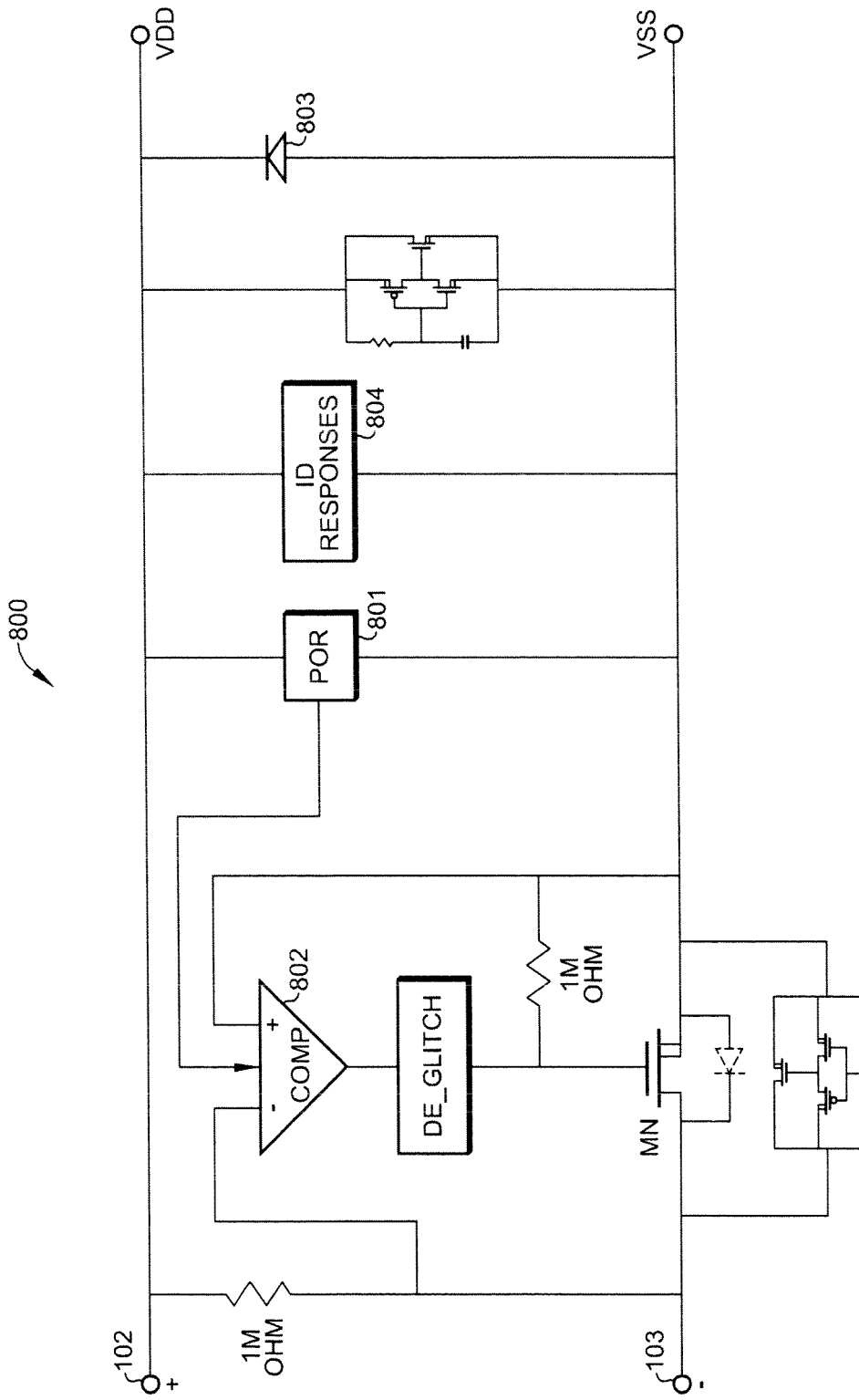
FIG. 8(a) is representative schematic circuit 800 for a receiver side integrated circuit, in accordance with one embodiment of the present invention.
Figure 8B:
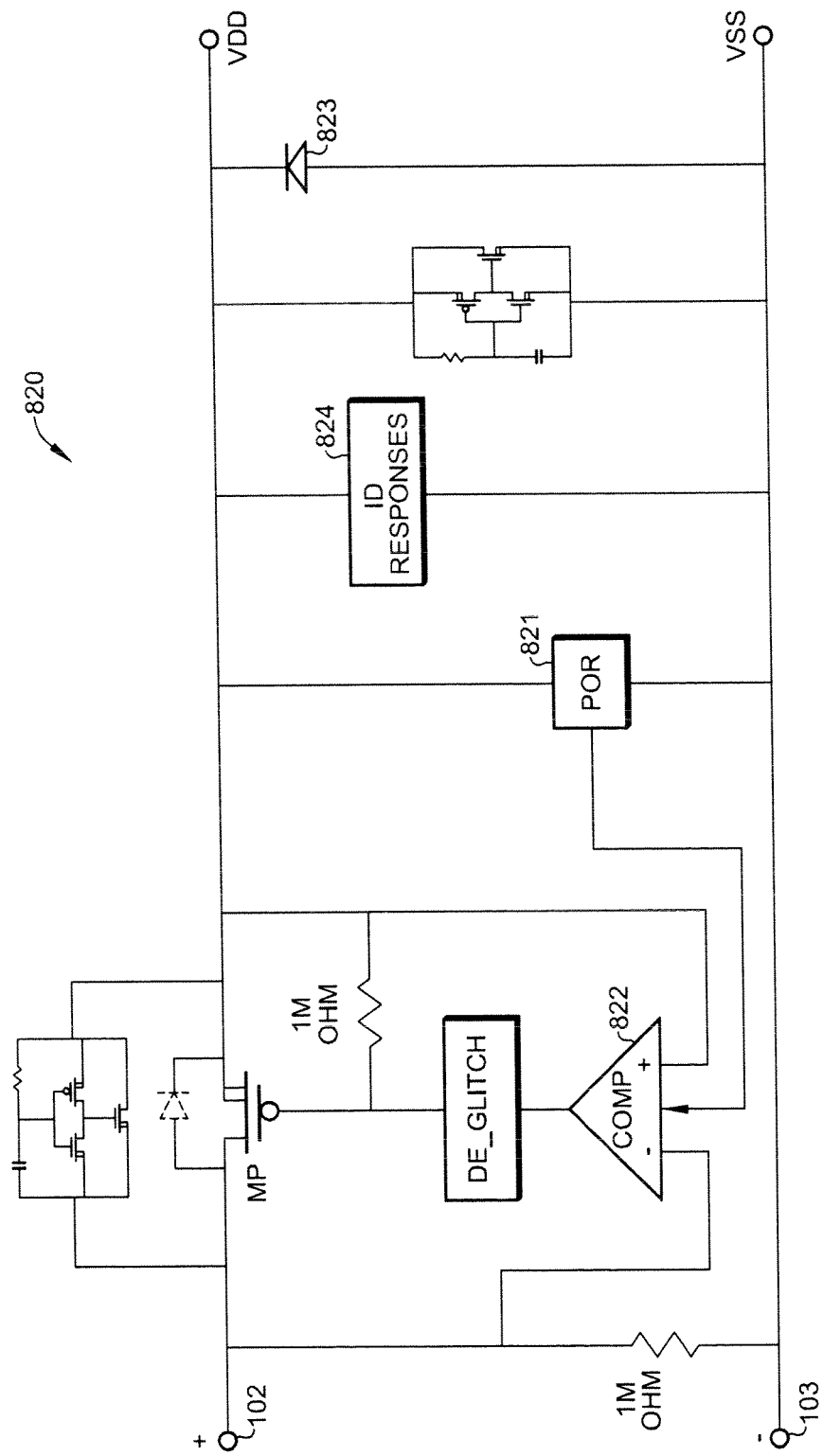
FIG. 8(b) is representative schematic circuit 820 for a receiver side integrated circuit, in accordance with one embodiment of the present invention.
Figure 8D:
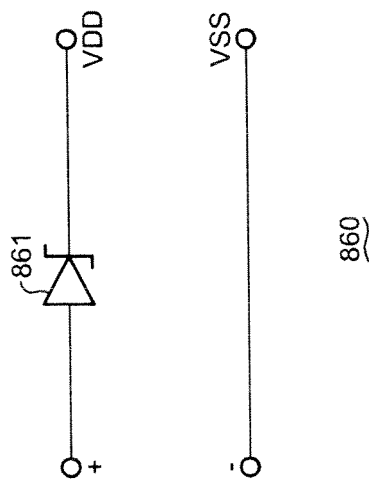
FIG. 8(d) is representative schematic circuit 860 for a receiver side integrated circuit, in accordance with one embodiment of the present invention.
Figure 8C:
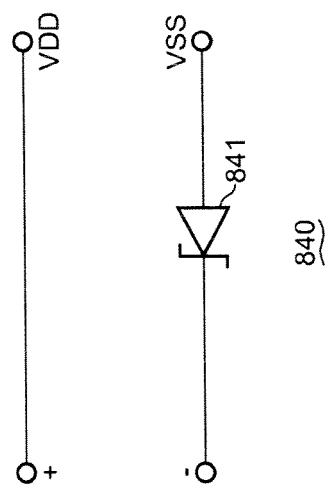
FIG. 8(c) is representative schematic circuit 840 for a receiver side integrated circuit, in accordance with one embodiment of the present invention.

FIG. 7 shows flow-chart 700 summarizing operations of a transmitter side integrated circuit described above.

FIG. 8(*a*) is representative schematic circuit 800 for a receiver side integrated circuit, in accordance with one embodiment of the present invention. As shown in FIG. 8(*a*), at power-on, so long as a reverse polarity is not provided across terminals 102 and 103, power-on reset circuit 801 causes comparator 802 to switch on transistor MN. If terminals 102 and 103 come into contact with a charge base (e.g., charge base 109) and if the hand-shaking signals are such that the voltage across terminals 102 and 103 is negative, comparator 802 turns off transistor MN to avoid imposing a negative voltage across the device to be charged. In addition, diode 803 provides additional protection. When the transmitter side provides the hand-shaking signals such that the voltage across terminals 102 and 103 is positive, comparator 802 turns on transistor MN to provide a positive voltage for charging across the device to be charged. In this manner, the conduction current is non-zero when a positive voltage is present from the "+" (102) terminal to the "−" (103) terminal, and the conduction current is negligible when the polarities are reversed, as required under the proprietary protocol discussed above. In addition, after the transmission side (e.g., integrated circuit 120) successfully detects polarities of the electrodes on the receiver side, ID response module 804 obtains identification information from the device to be charged and provides the identification information to the transmitter side.

During charging, transistor MN is fully conducting and internal comparator 802 compares the voltage between terminal "VSS" (at device being charged) and "−" (103) to monitor the channel current in transistor MN, to prevent power transfer from the device being charged to charge base 109.

FIG. 8(*b*) shows exemplary schematic circuit 820 for a receiver side integrated circuit, in accordance with one embodiment of the present invention. Circuit 820 operates in substantially the same manner as described for circuit 800 of FIG. 8(*a*), except that transistor MP of circuit 820 is a p-channel MOS transistor, while transistor MN of circuit 800 is an N-channel MOS transistor.

FIGS. 8(*c*) and 8(*d*) illustrate two alternative exemplary schematic circuits 840 and 860, each being suitable for a receiver side integrated circuit, in accordance with one embodiment of the present invention. Circuits 840 and 860 each include a zener diode (i.e., zener diodes 841 and 861) to prevent damage due to mismatched polarities between the charge base and the device to be charged. However, the power losses in circuits 840 and 860 are substantially higher than those of circuits 800 and 820 described above. Furthermore, circuits 840 and 860 do not have the capability of providing identification information of the device to be charged to the transmitter side.

Figure 9A:
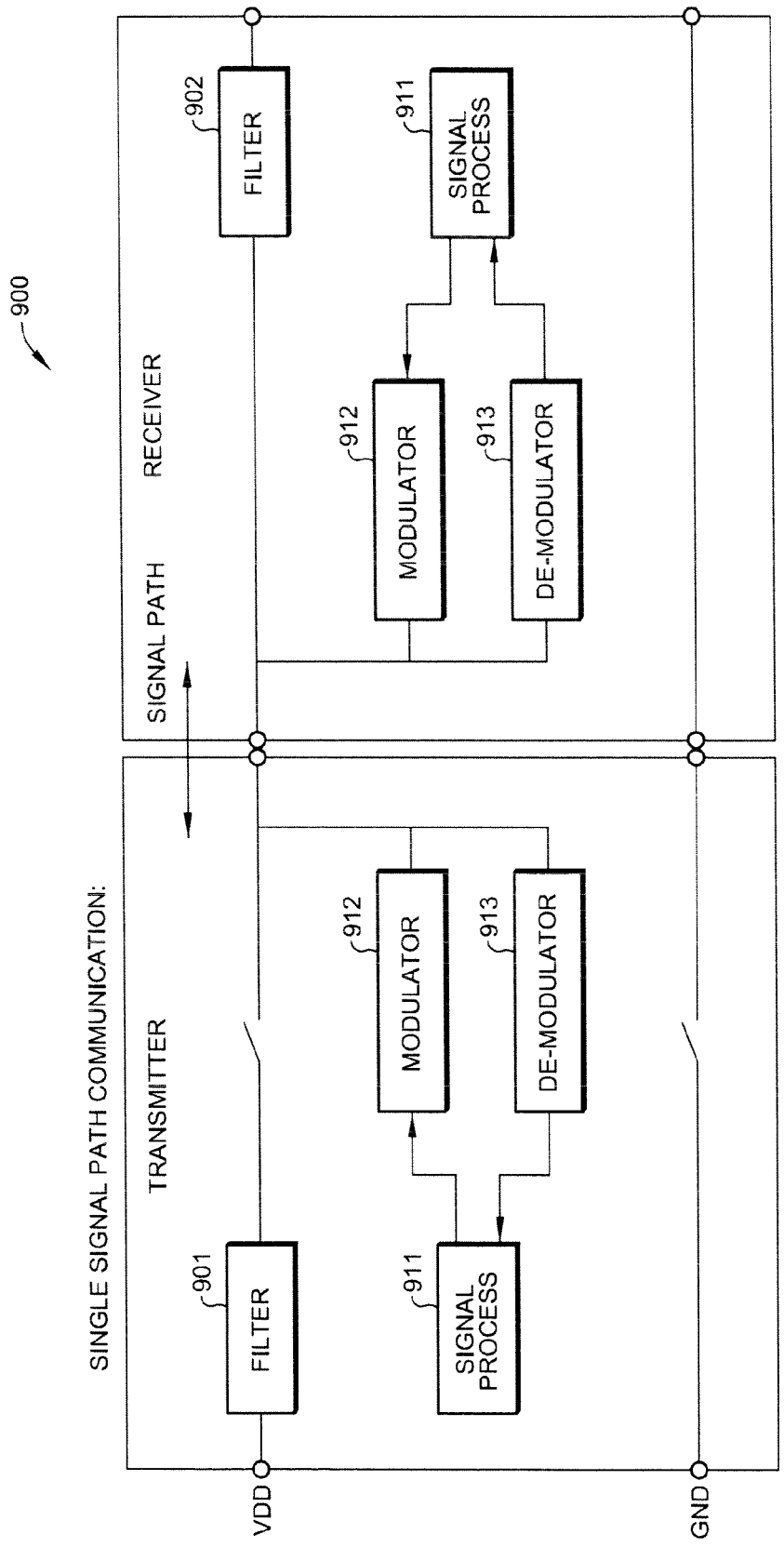
FIG. 9(a) is a block diagram of communication circuit 900 suitable for communicating information between the transmitter side (e.g., integrated circuit 120 of charge base 109) and the receiver side (e.g., integrated circuit 113 of back cover 101), in accordance with one embodiment of the present invention.
Figure 9B:
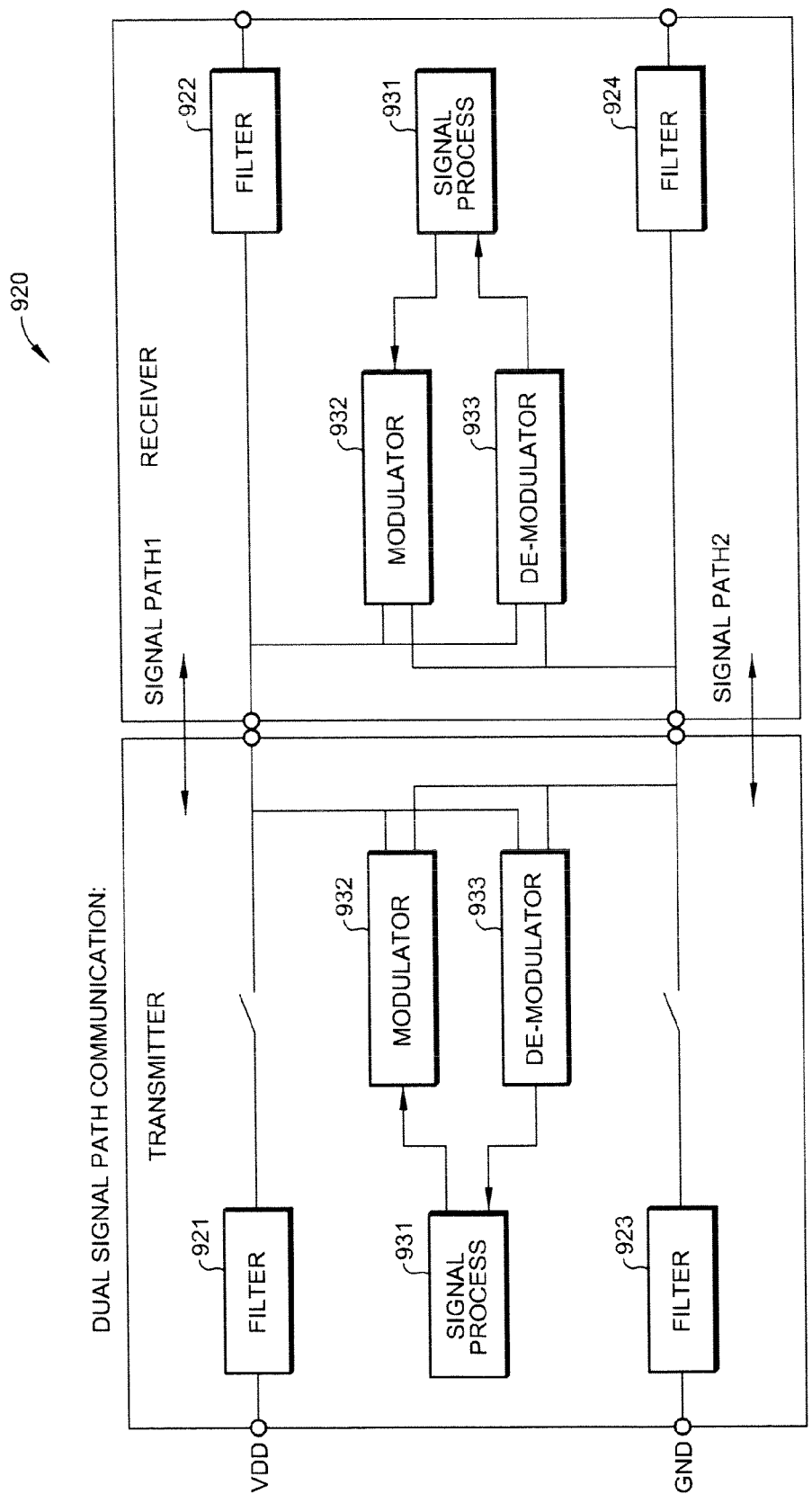
FIG. 9(b) is a block diagram of communication circuit 920 suitable for communicating information between the transmitter side and the receiver side, using both terminals (i.e., VDD and GND) as signal paths, in accordance with one embodiment of the present invention.

FIG. 9(*a*) is a block diagram of communication circuit 900 suitable for communicating information between the transmitter side (e.g., integrated circuit 120 of charge base 109) and the receiver side (e.g., integrated circuit 113 of back cover 101), in accordance with one embodiment of the present invention. As shown in FIG. 9(*a*), circuit 900 includes filters 901 and 902 on both sides of the communication path. Filters 901 and 902 are low-pass or DC-pass filters that are used to isolate the communication signal path—which are AC signals—from the low impedance power path. Filters 901 and 902 may each be implemented by a single inductor, or other components performing the required filter function. Because of filters 901 and 902, the communication protocol may be provided by a proprietary protocol without interfering with public communication signals. As shown in FIG. 9(*a*), data communication can be achieved (but not necessarily) by modulating data symbols (911) under modulation scheme 912 (e.g., using a carrier signal) for transmission and demodulated (913) when received. Signal communication may be unidirectional at a time (i.e., from transmitter to receiver or from receiver to transmitter), or bidirectional simultaneously (i.e., from transmitter to receiver and from receiver to transmitter).

FIG. 9(*b*) is a block diagram of communication circuit 920 suitable for communicating information between the transmitter side and the receiver side, using both terminals (i.e., VDD and GND) as signal paths, in accordance with one embodiment of the present invention. Since both the VDD and GND terminals are in the communication paths, additional filters 923 and 924 are provided.

The above detailed description is provided to illustrate the specific embodiments of the present invention and is not intended to be limiting. Numerous variations and modifications within the scope of the present invention are possible. The present invention is set forth in the following claims.

We claim:

1. In a charging system for a mobile device including a transmitter and a receiver, the receiver comprising:
   a first interface having a first terminal and a second terminal;
   a second interface having a first terminal and a second terminal coupled to a device to be charged;

a connection circuit between the first terminal of the first interface and the first terminal of the second interface, wherein the connection circuit is conductive when the voltage across the first terminal of the first interface and the second terminal of the first interface is of a first polarity, and the connection circuit is non-conductive when the voltage across the first terminal of the first interface and the second terminal of the first interface is of a second polarity opposite the first polarity.

2. The receiver of claim 1, further comprises a diode connecting the first and second terminals of the second interface.

3. The receiver of claim 1, wherein the connection circuit comprises a zener diode.

4. The receiver of claim 1, wherein the connection circuit comprises a transistor.

5. The receiver of claim 4, further comprising current sensing circuit that senses the channel current in the transistor wherein, when the channel current exceeds a predetermined threshold, the current sensing circuit turns off the transistor.

6. The receiver of claim 5, wherein the current sensing circuit comprises a comparator that compares the voltage across the first terminal of the first interface and a voltage at the second terminal of the second interface.

7. The receiver of claim 1, further comprising a communication circuit for providing data over the first and second terminals of the first interface.

8. The receiver of claim 7, further comprising a modulation circuit for modulating data for transmission to the transmitter.

9. The receiver of claim 7, further comprising a demodulation circuit for demodulating data received from the transmitter.

10. The receiver of claim 1, wherein the receiver is provided a cover to be placed over the device to be charged.

11. The receiver of claim 10, wherein the device to be charged comprises a mobile communication device.

12. The receiver of claim 11, wherein the mobile communication device comprises a camera, wherein the first terminal of the first interface is provided as a conductive ring around the camera of the mobile communication device.

13. The receiver of claim 11, wherein the second terminal of the second interface comprises a conductive name plate.

14. The receiver of claim 11, wherein the cover further comprises a connector for coupling a power connector of the mobile communication device.

15. In a charging system for a mobile device including a transmitter and a receiver, the method for a receiver comprising:
providing a first interface having a first terminal and a second terminal;
providing a second interface having a first terminal and a second terminal coupled to a device to be charged;
providing a connection circuit between the first terminal of the first interface and the first terminal of the second interface, wherein the connection circuit is conductive when the voltage across the first terminal of the first interface and the second terminal of the first interface is of a first polarity, and the connection circuit is non-conductive when the voltage across the first terminal of the first interface and the second terminal of the first interface is of a second polarity opposite the first polarity.

16. The method of claim 15, further comprises connecting a diode between the first and second terminals of the second interface.

17. The method of claim 15, wherein the connection circuit comprises a zener diode.

18. The method of claim 15, wherein the connection circuit comprises a transistor.

19. The method of claim 18, further comprising sensing the channel current in the transistor wherein, when the channel current exceeds a predetermined threshold, turning off the transistor.

20. The method of claim 19, wherein sensing the channel current comprises providing a comparator that compares the voltage across the first terminal of the first interface and a voltage at the second terminal of the second interface.

21. The method of claim 15, further comprising providing a communication circuit for providing data over the first and second terminals of the first interface.

22. The method of claim 15, further comprising providing a modulation circuit for modulating data for transmission to the transmitter.

23. The method of claim 15, further comprising providing a demodulation circuit for demodulating data received from the transmitter.

24. The method of claim 15, wherein the receiver is provided a cover to be placed over the device to be charged.

25. The method of claim 24, wherein the device to be charged comprises a mobile communication device.

26. The method of claim 25, wherein the mobile communication device comprises a camera, wherein the first terminal of the first interface is provided as a conductive ring around the camera of the mobile communication device.

27. The method of claim 25, wherein the second terminal of the second interface comprises a conductive name plate.

28. The method of claim 25, wherein the cover further comprises a connector for coupling a power connector of the mobile communication device.

* * * * *